Figure 1:
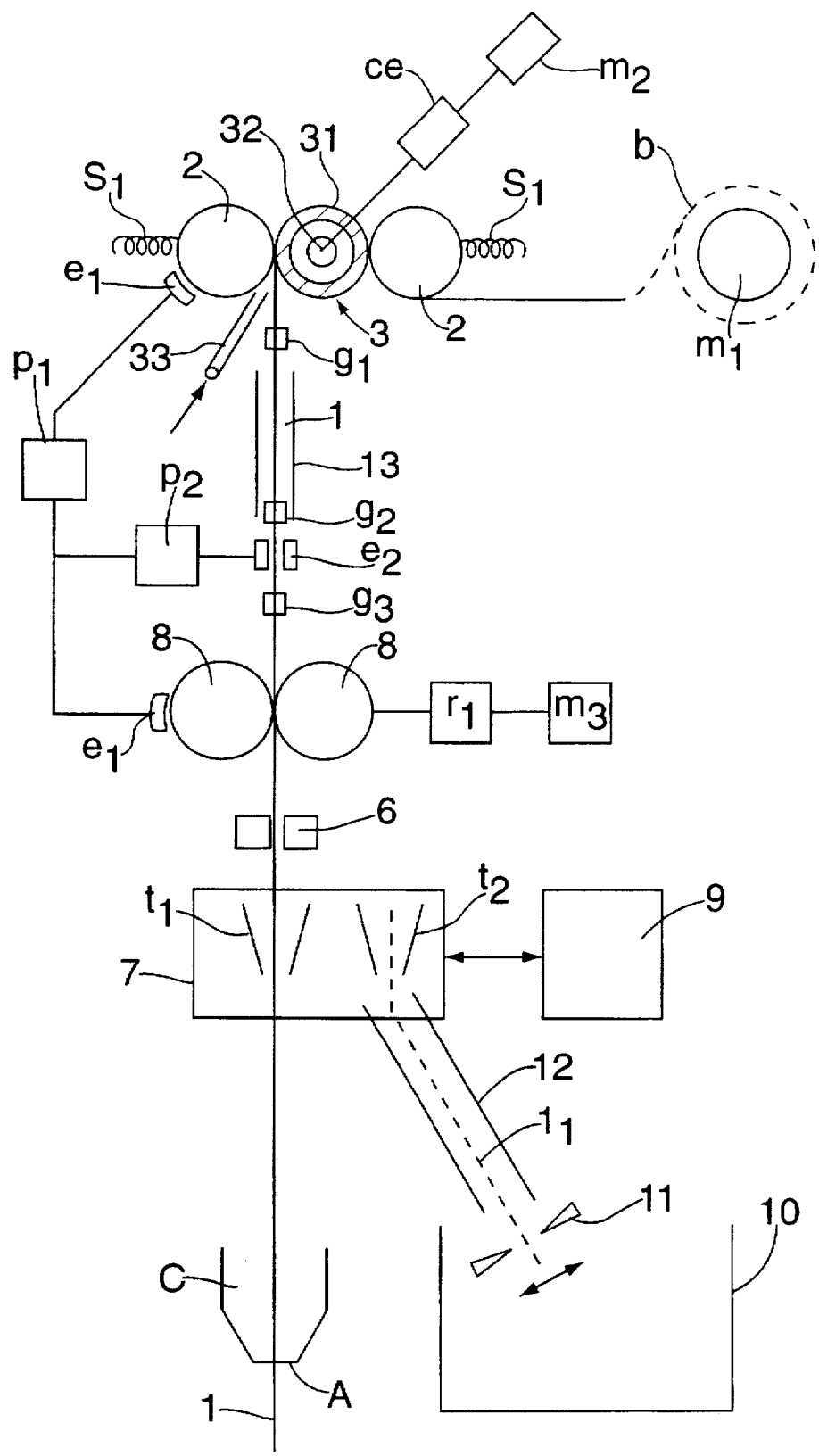

United States Patent [19]

Maidagan

[11] Patent Number: 5,796,063
[45] Date of Patent: Aug. 18, 1998

[54] AUTOMATIC CUTTING AND THREADING PROCEDURE AND MECHANISM FOR AN ELECTROEROSION MACHINE

[75] Inventor: Javier Maidagan, Vizcaya, Spain

[73] Assignee: Ona Electro-Erosion, S.A., Spain

[21] Appl. No.: 739,297

[22] Filed: Oct. 29, 1996

[51] Int. Cl.$^6$ ........................................ B23H 7/10
[52] U.S. Cl. ........................................ 219/69.12
[58] Field of Search .......................... 219/69.12

[56] References Cited

U.S. PATENT DOCUMENTS

| | | | |
|---|---|---|---|
| 4,412,118 | 10/1983 | Nomura et al. | 219/69.12 |
| 4,618,761 | 10/1986 | Inoue et al. | 219/69.12 |
| 4,686,343 | 8/1987 | Inoue | 219/69.12 |
| 4,698,478 | 10/1987 | Girardin | 219/69.12 |
| 4,778,972 | 10/1988 | Josserand | 219/69.12 |
| 5,077,457 | 12/1991 | Onaka et al. | 219/69.12 |
| 5,130,508 | 7/1992 | Umetsu et al. | 219/69.12 |
| 5,268,551 | 12/1993 | Kawanabe et al. | 219/69.12 |
| 5,288,966 | 2/1994 | Kawanabe et al. | 219/69.12 |

FOREIGN PATENT DOCUMENTS

| | | | |
|---|---|---|---|
| 206041 | 12/1986 | European Pat. Off. | 219/69.12 |
| 63-120033 | 5/1988 | Japan | 219/69.12 |

*Primary Examiner*—Geoffrey S. Evans
*Attorney, Agent, or Firm*—Bierman, Muserlian and Lucas

[57] ABSTRACT

The automatic cutting and re-threading mechanism for the electroerosion machine employs a baffle which moves into and out of alignment with the direction of the wire so as to route the unwanted waste wire from the electroerosion machine into a waste bin. In order to cut the wire, the wire is gripped between a feeder roller and a drawer roller at which point it is both heated and stretched prior to being cut. Two power supplies are employed, one power supply to heat the wire using electrodes which make contact with the feeder roller and the drawer roller and a second power supply which is used to heat the electrodes that cut the wire.

6 Claims, 1 Drawing Sheet

AUTOMATIC CUTTING AND THREADING PROCEDURE AND MECHANISM FOR AN ELECTROEROSION MACHINE

One of the biggest problems with electoerosion machines is that of re-threading wire.

The machine may include a system for the automatic re-threading of the wire, but should this fail, for example after repeated unsuccessful attempts at re-threading, the wire, which is very fine, soon gets damaged.

Likewise, accidental breakage of the wire may occur, or a fresh spool of wire is called for, or alternatively one job comes to an end and another is due to begin, and so forth.

The section of wire that has become damaged remains unwanted; and so manufacturers of electroerosion machines are faced with the following problems:

a) How to separate the section of unwanted wire from the remaining good wire;

b) How to dispose of the section of unwanted wire;

c) How to enable the good wire to pass easily through the holes and guides, and to be re-threaded;

d) To leave the wire that is to be re-threaded in peak condition of firmness, straightness and cross-section.

The solutions that have been found for these problems are described in the extensive literature, much of it recent, which is the best evidence that a proper solution has not been found for such problems.

The applicant has designed a procedure and its corresponding mechanism which, in a simple way, will provide a solution to these problems.

The essence of his invention consists of devising rollers that function variously for traction or feed, with an increase of temperature by the Joule effect at the point where the wire is to be cut by concentrating the flow of electrical current at that point, automating the removal of the unwanted wire that has been cut off and improving the feeding mechanism for the wire.

For a simpler understanding of the purpose of this invention, the working drawings show the most ideal form of operation in practice which can be modified incidentally without affecting the merits of the claim.

FIG. 1 is a diagrammatic representation of the layout of the elements that comprise the system that is the object of the invention.

Follows a description of a form of operation in practice, which is not restrictive, of this invention.

All electronic components and drives are controlled by a programmed microprocessor (not shown).

The invention includes a servomotor ($m_1$) equipped with a feeder-spool (b) for the wire (1) and uses conventional feeder mechanisms to convey the wire (1) to a feeder-roller (3) positioned between two pressure rollers (2), (2) each of which exerts pressure through the action of springs ($S_1$).

The feeder-roller (3) is activated by a servomotor ($m_2$) with a staged drive (ce) so that with the servomotor ($m_2$) operating and engaged, the feeder-roller (3) is tractive; and with the servomotor ($m_2$) halted and engaged, the feeder-roller (3) acts as a brake. All of the above is as per the level of activity required by the CPU activating the staged drive (ce).

The feeder-roller (3) is equipped with a layer (31) of flexible material that can be deteriorated by heat for which purpose, close to the outlet of the wire (1) from the feeder-roller, there is a small tube (33) for draught-cooling of the area where the layer in question (31) comes into contact with the wire (1).

The feeder-roller (3) also includes an encoder (32) that monitors the movement of the roller (3) since, as will be examined below, the feeder-roller (3) has to draw a specific amount for each type of wire (1) used.

At the point of exit from the feeder-roller (3), there is a first guide ($g_1$) and a duct (13) with a fold-down side for external access to the wire (1).

Immediately at the point of exit from the duct (13) there is a second guide ($g_2$), two electrodes ($e_2$) that by conventional means, such as pneumatic cylinders, make/do not make contact with the wire (1) under the control of the CPU and a third guide ($g_3$). The wire (1) next passes between two drawer rollers (8) that are conductors of electricity and that are activated by a motor ($m_3$) with its reducer ($r_1$) that can also be brought together or separated through CPU control.

Next there is a wire-presence detector (6) and a baffle (7) with a vertical guide-cone ($t_1$) that conducts the wire (1) under normal working conditions and a waste guide-cone ($t_2$) that conducts the waste wire ($l_1$).

The baffle (7) is changed over by the activation of the pneumatic cylinder (9).

The working is described below.

There are two alternatives for the wire (1) to start with:

I. The wire is in a defective condition because the wire has been accidentally broken or because the re-threading operation has been unsuccessful several times, and so forth. Wire in an abnormal condition.

II. The wire is in good condition and threaded but one job has been completed and a fresh job is to be begun.

Both alternatives consist of two essential stages:
preparation of the wire
cutting of wire and re-threading
Alternative I
Wire (1) in an abnormal condition.
Preparation of wire stage.

The section of wire (1) that is in a defective condition has to be discarded.

When the wire (1) is in a defective condition, such as broken, a conventional breakage-detector generates the corresponding signal that the CPU transforms into a command to the servomotor ($m_2$) so that the feeder-roller (3) of the wire (1) reverses its direction and instead of supplying wire to the machine, the roller takes it in.

When the detector (6) by inductive sampling detects that there is no wire (1) the following are the main occurrences that ensue:

a) The feeder-roller (3) is freed or partially braked in accordance with the CPU programme and the drawer rollers (8) are brought together and act to draw the wire (1) downstream.

b) The baffle (7) moves the waste guide-cone ($t_2$) under the detector (6) on the directrix of the wire and by means of the duct (12) draws the waste wire ($l_1$) towards the cutters (11) which cut it and place it in the waste-bin (10).

After a certain time or a number of turns of the feeder-roller (3) controlled by the encoder (32) on the basis of the amount of wire that is required to be discarded, the CPU commands:

c) the drawer rollers (8) to remain together but to act as a brake, that is, not to allow the wire (1) to pass; and the feeder-roller (3) to produce an upstream movement of the wire (1), and with its encoder (32) to turn at a predetermined angle ($\alpha$), that is, with a pre-determined stretch of the wire (1) programmed by the CPU for each type of wire used.

d) at the same time, the first circuit of electricity is completed, consisting of the first variable-current power supply ($P_1$), that can also be varied according to the programme, -pressure roller (2) - wire (1) - drawer rollers (8), by sampling with contact electrodes ($e_1$), with which the wire (1) is heated resulting in stretching and decrease in cross section, for example from 250μ to 230μ.

The feeder-roller (3) having turned through the angle (α), pre-determined for each type of wire specified above, the next stage follows.

Wire cutting and re-threading stage.

a) the feeder-roller (3) remains immobilized, fully braked, the drawer rollers (8) remain together and traction is exerted downstream to the wire;

b) at the same time, the first circuit of electricity is disconnected, and the second circuit of electricity is connected, consisting of the second variable-current power supply ($P_2$), that applies a strong current which is greater than that applied by the first circuit of electricity - cut-off electrodes ($e_2$) that are opposed to prevent any sag in the wire (1) - drawer rollers (8) through contact;

c) upon supplying the wire (1) with calorific energy in sufficient quantities and over a small area ($e_2$) and under sustained mechanical stress, the wire (1) breaks;

d) the drawer rollers (8) draw the wire towards the waste guide-cone ($t_2$) and into the waste-bin (10);

e) the pneumatic cylinder (9) positions the baffler (7) with its vertical guide-cone ($t_1$) underneath the detector (6), the cut-off electrodes ($e_2$) are separated, the drawer rollers (8) are separated, the feeder-roller (3) switches to traction downstream of the wire (1) and, as in a conventional re-threading operation, makes the wire (1) pass through the outlet guide (A) at the top flange (c) of the machine.

Alternative II

Preparation of the wire stage.

This operates in the same way as was discussed for Alternative I but without actions (a) and (b).

Cutting of wire and re-threading stage:

a) the drawer rollers (8) are drawn together and by braking obstruct the passage of the wire (1), whilst the feeder-roller (3) switches to traction upstream of the wire (1);

b), c) in the same way as was discussed for alternative I;

d) the drawer rollers (8) are separated, the feeder-roller (3) switches to traction downstream of the wire (1), and the tractor elements of the bottom flange (not shown) draw in the bottom section of the wire;

e) The cut-off electrodes ($e_2$) are disconnected, the feeder-roller (3) switches to traction downstream of the wire (1) (the top part of it) and procedures are resumed as for a conventional re-threading operation.

The mechanism of the present invention can be described as an automatic cutting and re-threading mechanism for electroerosion machine, consisting of a top guide-flange and a bottom guide-flange for wire, that are distinguished because they comprise:

a) a feeder-spool (b) for the wire (1) by which it is supplied to b) a feeder-roller (3) capable of acting as a drive or as a brake, and having downstream;

c) electrically conductive drawer rollers (8) capable of being separated-drawn together in regard to the wire (1), and acting as drive or brake, and d) a wire-presence detector (6) followed by e) a baffle (7) with a waste guide-cone ($t_2$) connected to a waste-bin (10) with a facility for moving the baffle and insert-remove the waste guide-cone ($t_2$) into/from the directrix of the wire (1);

f) a main power supply ($P_1$) that feeds wire (1) on demand between the feeder-roller (3) and the drawer rollers (8);

g) a secondary power supply ($P_2$) that feeds wire (1), on demand, between the feeder-rollers (3) and cut-off electrodes ($e_2$) that by the operation of drive controls monitored by the CPU make/do not make contact with the wire (1), and the cut-off electrodes ($e_2$) in question are arranged around the drawer rollers.

h) electrical-electronic mechanisms for the operation of all the above elements under the control of a programmable microprocessor.

Preferably, the automatic cutting and re-threading mechanism for electroerosion machinery has, between the feeder-roller (3) and the drawer rollers (8), successively of a first guide ($g_1$), a duct (13) with a fold-down side for external access, a second guide ($g_2$), and a third guide ($g_3$) close to the cut-off electrodes ($e_2$).

More preferably, the automatic cutting and re-threading mechanism for electroerosion machinery has the baffle (7) driven by a pneumatic cylinder (9) and comprises a vertical guide-cone ($t_1$) and a waste guide-cone ($t_2$) connected to a duct (12) whose outlet discharge into the waste-bin (10).

Still, more preferably, the automatic cutting and re-threading mechanism for electroerosion machinery has a feeder-roller (3) consisting of an outer layer (31) of flexible material and an encoder (32) that measures its angle of swing.

The process employed by the present invention can be described as an automatic cutting and re-threading procedure for electroerosion machinery having wire-detectors in an abnormal position, whose signals are picked up by a programmed microprocesser that activates the procedure, which consists of a) a wire preparation stage in which the feeder-roller (3) reverses its direction and becomes tractive, taking in wire (1) until the detector (6) indicates that there is no wire (1), the CPU then successively commanding:

Aa) the feeder-roller (3) to become free and the drawer rollers (8) to become tractive and draw the wire (1) downstream for a predetermined number of turns, while:

Ab) the baffle (7) moves the waste guide-cone ($t_2$) in the directrix of the wire (1);

Ac) the drawer rollers (8) act as a brake and do not allow the wire (1) to pass, and the feeder-roller (3) becomes tractive upstream of the wire (1) at a predetermined angle (α) while Ad) a first circuit of electricity is connected up, which is completed by the wire (1) between the pressure roller (2) and the drawer rollers (8) for the time that the feeder-roller (3) swings the predetermined angle (α), the CPU then commands:

b) a cutting and re-threading stage in which the CPU successively commands:

Ba) the feeder-roller (3) to act as a brake and not allow the wire to pass and the feeder-rollers (3) to become tractive downstream of the wire while Bb) the first circuit of electricity is disconnected and a second circuit of electricity is connected up, which supplies a current that is greater than that applied by the first circuit of electricity and is completed by the wire within a small area between the cut-off electrodes ($e_2$) and the drawer rollers (8).

Bc) the connection continues until the wire (1) is broken leaving a bottom wire and a top wire, Bd) the drawer rollers (8) separate and the tractive elements of the lower head of the machine draw in the lower wire, Be) the drawer rollers (8) separate and the feeder-roller (3) becomes tractive of the top wire which is re-threaded.

What is claimed is:

1. Automatic cutting and re-threading mechanisms for an electroerosion machine, having a top guide-flange and a bottom guide-flange for wire, said mechanisms comprising:

a) a feeder-spool (b) for the wire (1) by which the wire (1) is supplied to b) a feeder-roller (3) capable of acting as a drive or as a brake for the wire (1), and having downstream:

c) electrically conductive drawer rollers (8) capable of being separated-drawn together in regard to the wire (1), and acting as drive or brake for the wire (1), and d) a wire-presence detector (6) followed by e) a baffle (7) with a waste guide-cone ($t_2$) connected to a waste-bin (10) with a facility for moving the baffle so that the waste guide-cone ($t_2$) is inserted into-removed from the directrix of the wire (1), the baffle (7) moving independent of the drawer-rollers (8);

f) a main power supply ($P_1$) that feeds wire (1) on demand between the feeder-roller (3) and the drawer rollers (8);

g) a secondary power supply ($P_2$) that feeds wire (1), on demand, between the feeder-rollers (3) and cut-off electrodes ($e_2$) that by the operation of drive controls monitored by the CPU can make contact with the wire (1), and the cut-off electrodes ($e_2$) are arranged around the drawer rollers (8); and h) electrical-electronic mechanisms for the operation of all the above elements under the control of a programmable microprocessor.

2. The mechanisms of claim 1 wherein between the feeder-roller (3) and the drawer rollers (8), the wire (1) successively travels through a first guide ($g_1$), a duct (13) with a fold-down side for external access, a second guide ($g_2$), and a third guide ($g_3$), the third guide ($g_3$) being close to the cut-off electrodes ($e_2$).

3. The mechanisms of claim 1 wherein the baffle (7) is driven by a pneumatic cylinder (9) and further comprises a vertical guide-cone ($t_1$) and the waste guide-cone ($t_2$) is connected to a duct (12) whose outlet discharges into the waste-bin (10).

4. The mechanisms of claim 1 wherein the feeder-roller (3) has an outer layer (31) of flexible material and an encoder (32) that measures angular rotation of the feeder-roller (3).

5. A process for automatically cutting and re-threading wire on an electroerosion machine which has wire detectors connected for detecting abnormal conditions in the wire, the wire detector sending signals to a microprocessor for controlling the process, the process comprising:

(a) reversing a feeder-roller (3) so as to take up wire (1) until a detector (6) positioned below drawer rollers (8) detects no wire (1);

(b) freeing the feeder-roller (3) and activating drawer rollers (8) to turn a predetermined number of turns and draw wire (1) downstream while moving a baffle (7) and a waste guide-cone ($t_2$) into the directrix of the wire (1) while maintaining drawer rollers (8) in position;

(c) braking drawer rollers (8) to hold wire (1) and activating feeder-roller (3) to rotate feeder-roller (3) a predetermined angle ($\alpha$);

(d) heating wire (1) by means of a first circuit which is connected between pressure roller (2) and drawer rollers (8), said heating taking place when the feeder roller (3) rotates through the predetermined angle ($\alpha$) so as to stretch wire (1);

(e) cutting said wire by disconnecting said first circuit and connecting a second circuit so as to supply electrical current which is greater than that applied by the first circuit, to a cutoff electrode ($e_2$) so as to cut wire (1) and provide a bottom wire ($1_1$) for waste;

(f) drawing the bottom wire ($1_1$) by means of the drawer rollers (8) and depositing the bottom wire ($1_1$) to a waste-bin (10);

(g) moving the baffle (7) and a vertical guide cone ($t_1$) into the directrix of the wire (1); and (h) separating the drawer rollers (8) and activating the feeder roller (3) to cause the wire (1) to move downstream and become re-threaded.

6. A process for automatically cutting and re-threading wire on an electroerosion machine for starting a fresh job wherein a microprocessor is used for controlling the process, the process comprising:

(a) braking drawer rollers (8) to hold wire (1) and reversing feeder-roller (3) to rotate feeder-roller (3) a predetermined angle ($\alpha$);

(b) heating wire (1) by means of a first circuit which is connected between pressure roller (2) and drawer rollers (8), said heating taking place when the feeder roller (3) rotates through the predetermined angle ($\alpha$) so as to stretch wire (1);

(c) cutting said wire by disconnecting said first circuit and connecting a second circuit so as to supply electrical current which is greater than that applied by the first circuit, to a cutoff electrode ($e_2$) so as to cut wire (1) and provide a bottom wire ($1_1$) for waste;

(d) drawing the bottom wire ($1_1$) by means of the drawer rollers (8);

(e) separating the drawer rollers (8) and activating the feeder roller (3) to cause the wire (1) to move downstream and become re-threaded.

* * * * *